Figure 1:
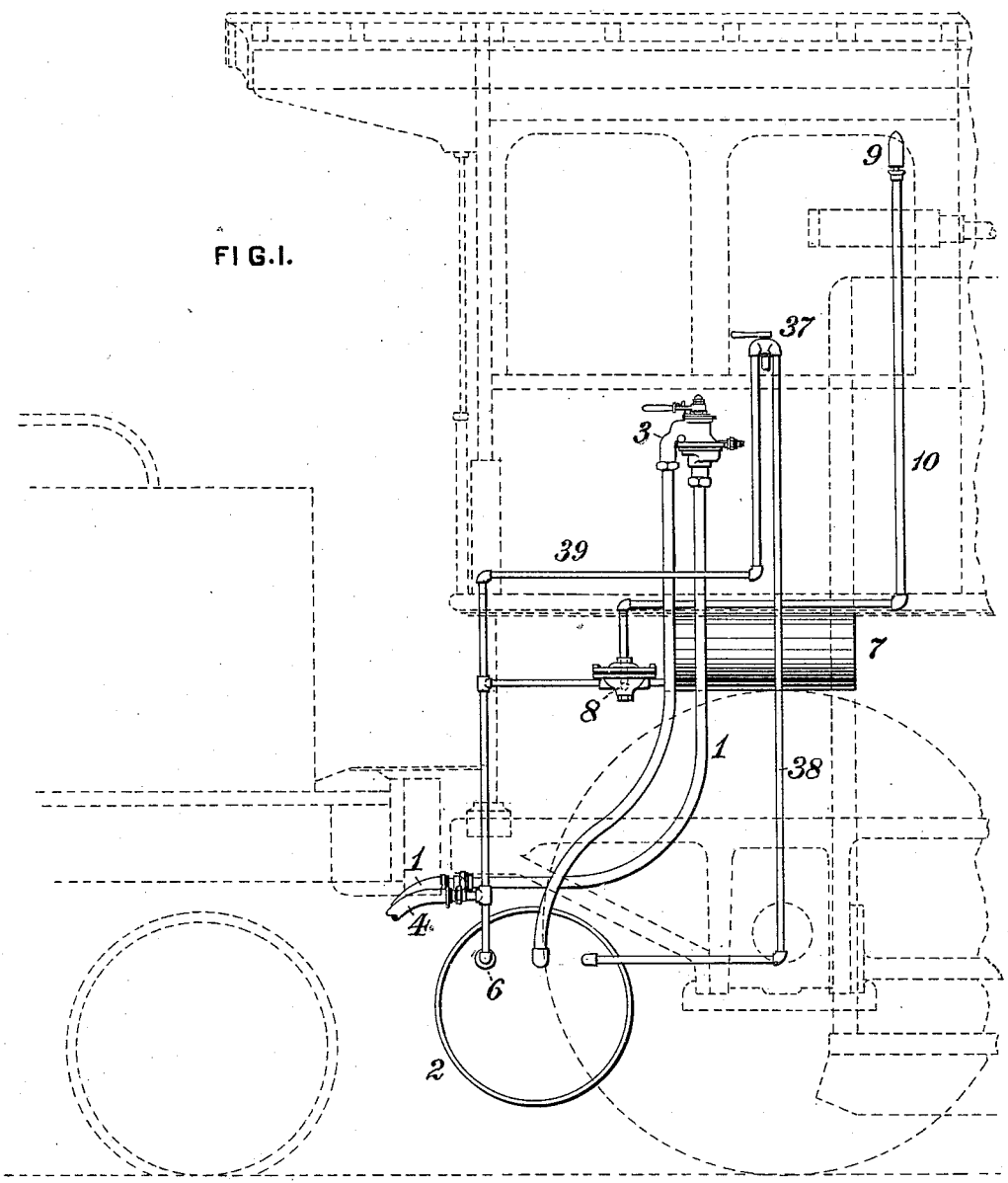

(No Model.)  5 Sheets—Sheet 1.

G. WESTINGHOUSE, Jr.
FLUID PRESSURE AUTOMATIC BRAKE MECHANISM.

No. 425,059.  Patented Apr. 8, 1890.

WITNESSES:  INVENTOR,

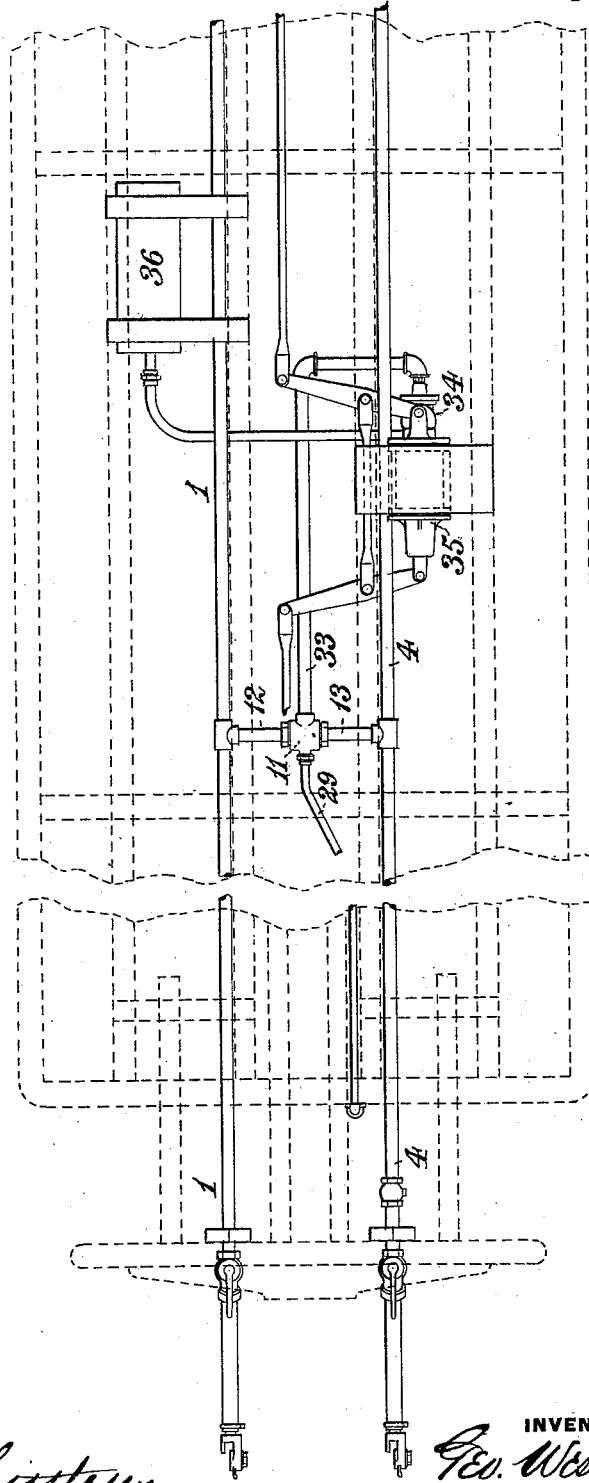

(No Model.) 5 Sheets—Sheet 3.
G. WESTINGHOUSE, Jr.
FLUID PRESSURE AUTOMATIC BRAKE MECHANISM.
No. 425,059. Patented Apr. 8, 1890.
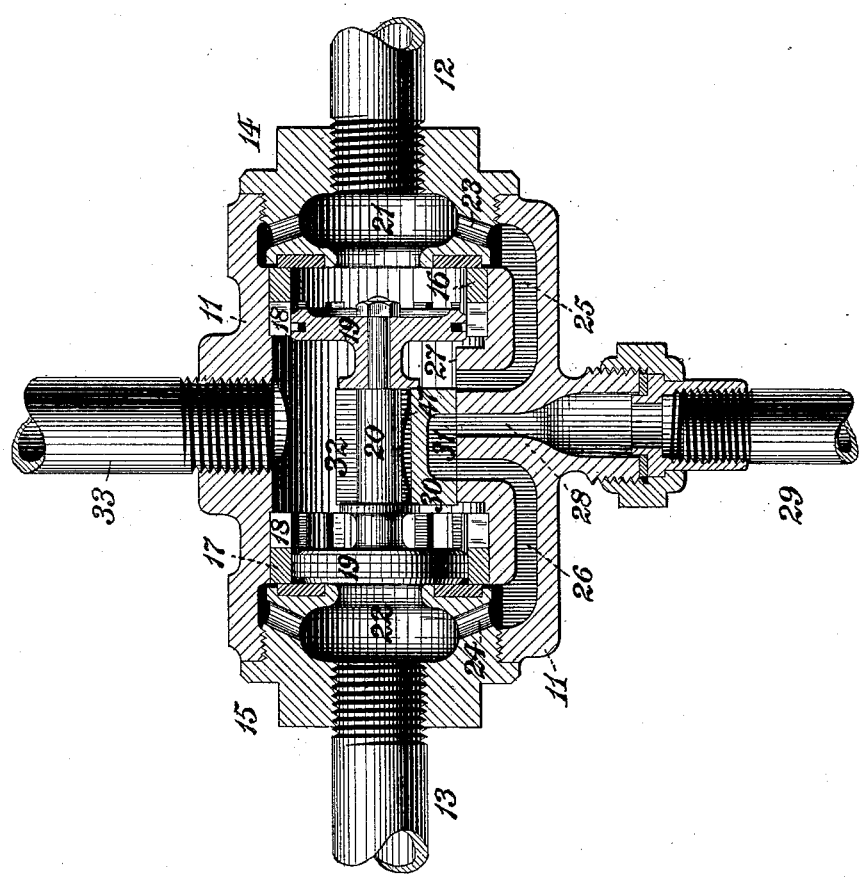
WITNESSES:
INVENTOR,
Att'y.

(No Model.) 5 Sheets—Sheet 4.
G. WESTINGHOUSE, Jr.
FLUID PRESSURE AUTOMATIC BRAKE MECHANISM.
No. 425,059. Patented Apr. 8, 1890.
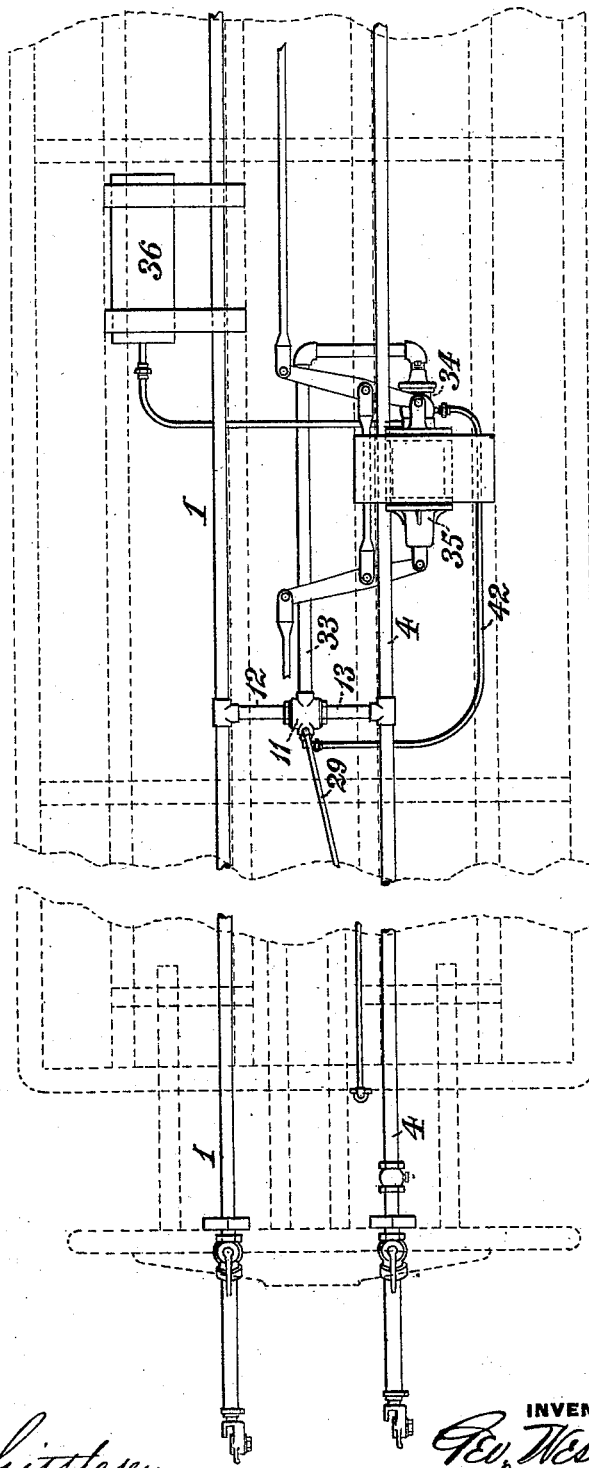

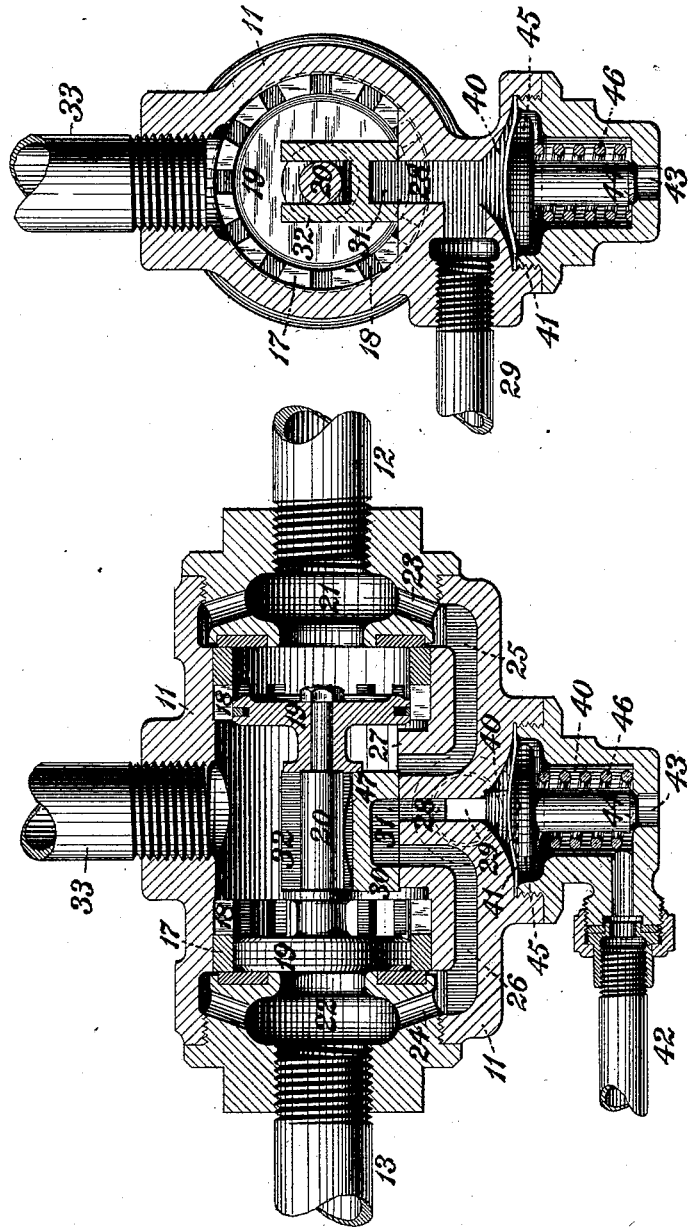

UNITED STATES PATENT OFFICE.

GEORGE WESTINGHOUSE, JR., OF PITTSBURG, PENNSYLVANIA.

FLUID-PRESSURE AUTOMATIC BRAKE MECHANISM.

SPECIFICATION forming part of Letters Patent No. 425,059, dated April 8, 1890.

Application filed July 29, 1889. Serial No. 319,040. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Fluid-Pressure Automatic Brake Mechanism, of which improvement the following is a specification.

The object of my invention is to admit of the employment of either of two fluid-pressure conducting-pipes, which transmit fluid under relatively high and low pressures, respectively, as a train-brake pipe and a train-signaling pipe, for the performance of the functions of the other, and vice versa, whenever such change may become requisite or desirable, by the provision of means whereby the relations of communication between said conducting-pipes and their supply and delivery connections may be automatically varied upon such variation of pressure in either line as will institute a preponderance of pressure in the normally-low-pressure line, so as to adapt said line to serve the purpose ordinarily performed by the opposite line.

A further object of my invention is to enable the exhaust of air from a brake-cylinder to be controlled as desired, in order to maintain the brake-shoes in contact with the wheels while recharging the auxiliary reservoir, as in descending long and heavy grades.

The improvement claimed is hereinafter fully set forth.

In the accompanying drawings, Figure 1 is a side view in elevation illustrating the connections of the brake and signal pipes of an automatic air-brake system upon a locomotive-engine; Fig. 2, a plan or top view illustrating the application of my invention to the air-brake apparatus of a railroad-car; Fig. 3, a longitudinal central section, on an enlarged scale, through the reversing-valve mechanism; Fig. 4, a transverse central section through the same; Fig. 5, a plan or top view of the main portion of the brake apparatus of a railroad-car, illustrating the application of means for controlling exhaust from the brake-cylinder; Fig. 6, a longitudinal central section through the reversing-valve mechanism thereof, and Fig. 7 a transverse central section through the same.

My invention is herein shown as applied in connection with an automatic air-brake and train-signaling apparatus of the Westinghouse type, which accords with that employed in standard practice and familiarly known in the art, and need not therefore be fully and at length described.

The main air or brake pipes 1, the function of which is to transmit air for actuating the brakes of the several cars of the train, are coupled in the ordinary manner to form a continuous line, which is supplied with air at a comparatively high pressure—as, say, seventy-five pounds to the square inch—from the main air-reservoir 2 on the locomotive, the supply and exhaust of air to and from the brake-pipe being controlled by the engineer's brake-valve 3. The signal-pipes 4 of the several cars, the normal function of which is the transmission of air for train-signaling purposes, are similarly connected in continuous line and are supplied with air from the main reservoir 2 through a reducing-valve 6 at a pressure which is materially less than that in the brake-pipe 1, being in ordinary practice, say, about twenty-five pounds to the square inch.

A reduction of pressure in the signal-pipe 4, effected by opening a discharge-valve on either of the cars of the train, discharges air from a signaling-reservoir 7 on the locomotive through a signaling-valve 8, the air so discharged sounding a blast upon a whistle 9, which is connected by a pipe 10 with the signaling-valve.

Under certain circumstances, as in the reversal or turning of cars end for end, or the crossing of hose at the ends of cars, it becomes desirable to provide for a relative transfer of function of the brake and signal pipes, or, in the event of the rupture of the brake-pipe, to render the signal-pipe immediately and suitably available for braking purposes. These ends are attained by connecting the brake and signal pipes through the intermediation of a reversible valve mechanism, the construction and operation of which will now be described.

A valve casing or chamber 11 is connected at one end by a pipe 12 with the brake-pipe 1, and at the opposite end by a pipe 13 with the signal-pipe 4, the connecting-pipes 12 13 being secured to heads or caps 14 15, which close the ends of the casing 11, and in which are formed chambers 21 and 22, respectively. Sleeves or bushings 16 17 are fitted into the casing 11 at its ends, a series of circumferential slots or passages 18 being formed in each bushing at and near its inner end. A reversing-valve formed of two end pistons 19, secured upon a connecting-stem 20, is fitted to move freely in the valve-casing 11, the valve-pistons 19 fitting and working in the bushings 16 and 17, and the width of the pistons and traverse of the valve being such that at either end of the stroke of the latter the piston at that end will close communication between the interior of the casing and the chamber of the adjacent head 15 or 14, as the case may be, and communication will be open past the piston at the opposite end through the slots 18, between the chamber of the head adjacent to said piston and the interior of the valve-casing. The chambers 21 22 of the heads 14 15 are connected by ports 23 and 24 with ports 25 and 26, formed in the valve-casing 11 and opening at their inner ends on a valve-face 27 therein, which is located between the inner limits of the traverse of the valve-pistons 19. A port 28 opens at its inner end on the valve-face 27, between the openings of the ports 25 and 26, extending from the valve-face to a connection with a pipe 29, leading to the discharge-valve of the signal-pipe of the car. The openings of the ports 25, 26, and 28 are controlled by a slide-valve 30, having an internal recess or cavity 31, similar to the exhaust-recess of a steam-distribution slide-valve, and provided with wings 32, which extend on opposite sides of the stem 20 of the reversing-valve and abut at their ends against collars on the inner sides of the end pistons 19 of said valve, so that the slide-valve 30 will move coincidently with the reversing-valve throughout and in each direction of the traverse of the latter. The slide-valve is held in contact with the valve-face by a spring 47. The space within the valve-casing 11 between the end pistons of the reversing-valve is connected by a pipe 33 with the triple valve 34 of the brake apparatus, the triple valve being connected in the usual manner with the brake-cylinder 35 and auxiliary reservoir 36. The pipe 33 serves to supply air under pressure to the auxiliary reservoir through the triple valve, and performs in the reduction of pressure for applying the brakes the same function as the brake-pipe 1, being practically equivalent to a continuation of the same.

Fig. 3 shows the position occupied by the reversing-valve and connected slide-valve during such period as a preponderance of pressure is maintained in the brake-pipe over that in the signal-pipe, the same forcing the valves to the left and maintaining communication between the brake-pipe and triple valve through the pipe 33, the slots 18 in the adjacent end bushing of the valve-casing and ports 23 and 25 and the pipe 33. Upon a reduction of pressure in the brake-pipe to a degree below that in the signal-pipe, as would be occasioned by placing the brake-pipe of a car in communication with the signal-pipe line of the remainder of the train or by the rupture of the brake-pipe, the then greater pressure in the signal-pipe forces the reversing-valve and slide-valve to the right, the signal-pipe then communicating with the triple valve through the pipe 13, slots 18 in the adjacent end bushing of the valve-casing, and ports 24 and 26 and pipe 33. The signal-pipe is then in condition to transmit air at the higher pressure required for braking purposes to the triple valve 34, such higher pressure being admitted by a supplemental engineer's brake-valve 37, provided for the purpose and communicating by pipes 38 and 39 with the main reservoir 2 and the signal-pipe 4, respectively. The slide-valve 30, moving to the right coincidently with the reversing-valve, establishes communication between the car discharge-valve port 28 and the port 25, and through said ports and the pipes 29 and 12 between the car discharge-valve and the brake-pipe 1, thereby adapting the brake-pipe to perform the function of the signal-pipe by providing the brake-pipe with the necessary vent for actuating the signal-valve 8 by a reduction of pressure in the brake-pipe. It will thus be seen that in either position of the reversing-valve the car discharge-valve port 28 and connecting-pipe 29 are in communication with the end chamber of the valve-casing 11, in which the lower pressure of air is maintained—that is to say, the chamber which is connected with the pipe then acting as the signal-pipe.

Figs. 5, 6, and 7 illustrate the application of a supplemental valve and pipe for controlling the exhaust of air from the brake-cylinder, when desired, in order to hold the brake-shoes to the wheels during the recharging of the auxiliary reservoir or in descending grades. The reversing-valve mechanism is similar to that above described, with the addition of a chamber 40, with the upper portion of which the port 28 communicates at its lower end, the car discharge-valve connection-pipe 29 communicating with a lateral branch of the port 28. The chamber 40 is fitted with a movable abutment, which is preferably, as shown, a flexible diaphragm 41, secured at its periphery to the chamber, and said chamber communicates by a pipe 42 on the outer side of the diaphragm 41 with the exhaust-opening of the triple valve 34. A port or outlet 43 for the discharge of air delivered from the brake-cylinder through the triple valve by the pipe 42 is formed in the outer end of the chamber 40, and is governed by a valve 44, the stem of which is provided with a head 45, which abuts against the diaphragm 40. The valve 44 is held normally open or unseated by a spring 46, of higher tension than the usual or working pressure of air in the signal or low-pressure conducting-pipe. When it is desired to close the exhaust of air from the brake-cylinder, the engineer, by means of the valve 37, admits a sufficient pressure of air to the signal-pipe to overcome the tension of the spring 46, which pressure, acting upon the diaphragm 41, closes the valve 44, thereby closing the outlet of the pipe 42 and preventing the exhaust of air from the brake-cylinder until such increase of pressure is relieved.

It will be seen that in the operation of an air-brake and train-signaling apparatus embodying my invention it will be immaterial whether the brake-pipe of a car be coupled to the brake-pipe or to the signal-pipe of the adjacent car, inasmuch as the reversing-valve will in every case be moved by the difference of pressure in the brake and signal pipes into such position as to place the triple valve of the brake apparatus in communication with the pipe which transmits air at the higher pressure, and the car discharge or actuating valve of the signaling apparatus in communication with the pipe which transmits air at the lower pressure. A similar transfer of function of the signal-pipe will be correspondingly effected by the movement of the reversing-valve incident to a rupture of the brake-pipe. It will be further obvious that the devices above described for closing the brake-cylinder exhaust, while conveniently and desirably applicable in connection with the mechanism by which a transfer of operative function of the brake and signal pipes is effected, does not constitute a necessary element thereof, and may or may not be employed, in the discretion of the constructer.

I claim as my invention and desire to secure by Letters Patent—

1. The combination of two lines of pipe for conducting fluid under relatively different pressures, two independent mechanisms actuated, respectively, by the fluid-pressures in said conducting-pipes, and a reversible-valve device controlling connections between each of said mechanisms and either of said conducting-pipes, substantially as set forth.

2. The combination of two lines of pipe for conducting fluid under relatively different pressures, two independent mechanisms actuated, respectively, by the fluid-pressures in said conducting-pipes, and a reversible-valve device which is subject to pressure from each of said conducting-pipes and is automatically operated by a preponderance of pressure in either thereof, and connections controlled by said valve device between each of said mechanisms and either of said conducting-pipes, substantially as set forth.

3. In a fluid-pressure brake and signal apparatus, the combination of a fluid-pressure brake mechanism, a fluid-pressure signaling mechanism, a brake-pipe for the conduction of fluid under normally-high pressure, a signal-pipe for the conduction of fluid under normally-low pressure, and a reversible-valve device connected with the brake and the signaling apparatus, and simultaneously controlling communication between one of said apparatus and the pipe which is under the higher pressure and between the other apparatus and the pipe which is under the lower pressure, substantially as set forth.

4. In a fluid-pressure brake and signal apparatus, the combination of a fluid-pressure brake mechanism, a fluid-pressure signaling mechanism, a brake-pipe for the conduction of fluid under normally-high pressure, a signal-pipe for the conduction of fluid under normally-low pressure, a ported valve-casing communicating, respectively, with the brake-pipe, the signal-pipe, the brake-operating valve, and the signal-operating valve, and a reversible valve working in said casing and adapted to be moved by a preponderance of pressure in either pipe into position to open a port from the then higher-pressure pipe to the brake-operating valve, and to simultaneously open a port from the then lower-pressure pipe to the signal-actuating valve, substantially as set forth.

5. In a fluid-pressure brake and signaling apparatus, the combination of a fluid-pressure brake mechanism, a fluid-pressure signaling mechanism, a brake-pipe for the conduction of fluid under normally-high pressure, a signal-pipe for the conduction of fluid under normally-low pressure, a valve controlling the exhaust of fluid from the triple valve of the brake mechanism, a spring which holds said valve normally open, and a movable abutment subject to pressure from the signal-pipe and adapted to close or seat said valve, substantially as set forth.

6. The combination of a valve-casing having a port at each end for the connection of a fluid-pressure conducting-pipe, longitudinal ports connecting its ends with an intermediate valve-face, a central lateral port leading from the valve-face to a connection with a fluid-conducting pipe, and a central lateral port exterior to the valve-face, a reversing-valve formed of two connected pistons, each controlling communication between the central lateral port which is exterior to the valve-face and one of the end ports, and a slide-valve coupled to the stem of the reversing-valve, said slide-valve working over the valve-face and controlling communication between the central lateral port terminating thereon and each of the end ports, substantially as set forth.

In testimony whereof I have hereunto set my hand.

GEO. WESTINGHOUSE, JR.

Witnesses:
W. D. UPTEGRAFF,
J. SNOWDEN BELL.